(12) United States Patent
Inoue et al.

(10) Patent No.: US 11,732,055 B2
(45) Date of Patent: *Aug. 22, 2023

(54) METHOD FOR MANUFACTURING CARBOXYMETHYLATED CELLULOSE NANOFIBER

(71) Applicant: NIPPON PAPER INDUSTRIES CO., LTD., Tokyo (JP)

(72) Inventors: Kazuhiko Inoue, Tokyo (JP); Takeshi Nakatani, Tokyo (JP); Yusuke Tada, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/769,836

(22) PCT Filed: Dec. 5, 2018

(86) PCT No.: PCT/JP2018/044677
§ 371 (c)(1),
(2) Date: Jun. 4, 2020

(87) PCT Pub. No.: WO2019/111928
PCT Pub. Date: Jun. 13, 2019

(65) Prior Publication Data
US 2020/0369787 A1    Nov. 26, 2020

(30) Foreign Application Priority Data

Dec. 7, 2017   (JP) ................................ 2017-235016
Apr. 12, 2018  (JP) ................................ 2018-076540

(51) Int. Cl.
| C08B 11/12 | (2006.01) |
| C08B 11/20 | (2006.01) |
| D01F 2/28  | (2006.01) |
| B82Y 30/00 | (2011.01) |
| B82Y 40/00 | (2011.01) |

(52) U.S. Cl.
CPC .............. *C08B 11/12* (2013.01); *C08B 11/20* (2013.01); *D01F 2/28* (2013.01); *B82Y 30/00* (2013.01); *B82Y 40/00* (2013.01)

(58) Field of Classification Search
CPC .. C08B 3/06; C08B 11/20; B05D 3/00; B82Y 30/00
See application file for complete search history.

(56) References Cited

U.S. PATENT DOCUMENTS

| 4,270,914 A | 6/1981 | Dahl |
| 4,491,661 A * | 1/1985 | Bredereck ................ C08B 11/00 536/84 |
| 4,579,943 A | 4/1986 | Kamide et al. |
| 5,722,433 A | 3/1998 | Ishino et al. |
| 11,092,587 B2 | 8/2021 | Nakatani et al. |
| 2006/0014721 A1 | 1/2006 | Zhang et al. |
| 2009/0233509 A1 | 9/2009 | Bellini et al. |
| 2016/0333116 A1* | 11/2016 | Nakatani ................. C08B 11/12 |
| 2019/0055323 A1 | 2/2019 | Kakubari et al. |
| 2019/0116858 A1 | 4/2019 | Kawasaki et al. |
| 2019/0330767 A1 | 10/2019 | Takaichi et al. |
| 2021/0163629 A1 | 6/2021 | Inoue et al. |
| 2021/0180214 A1 | 6/2021 | Inoue et al. |
| 2021/0214465 A1 | 7/2021 | Inoue et al. |
| 2021/0214466 A1 | 7/2021 | Inoue et al. |

FOREIGN PATENT DOCUMENTS

| EP | 1920787 A2 | 5/2008 |
| JP | S27-1944 B1 | 5/1952 |
| JP | S33-05645 B1 | 7/1958 |
| JP | H01-044201 B2 | 9/1989 |
| JP | H09-176201 A | 7/1997 |
| JP | H10-251301 A | 9/1998 |
| JP | 2002-194001 A | 7/2002 |
| JP | 2007-191558 A | 8/2007 |
| JP | 2008-1728 A | 1/2008 |
| JP | 2008-222859 A | 9/2008 |
| JP | 2012-012553 A | 1/2012 |
| JP | 2013-185122 A | 9/2013 |
| JP | 2015-149929 A | 8/2015 |

(Continued)

OTHER PUBLICATIONS

Wang et al., Preparation of Nanocellulose from Corn Cob Ethanol Bioresidue and its Effects on Paper Properties. Journal of Tianjin University of Science & Technology. Jun. 2018;33(3):40-45.
International Search Report and Written Opinion for Application No. PCT/JP2018/044686, dated Jan. 29, 2019, 4 pages.
International Search Report and Written Opinion for Application No. PCT/JP2018/044690, dated Mar. 5, 2019, 6 pages.
International Search Report and Written Opinion for Application No. PCT/JP2018/044702, dated Feb. 12, 2019, 8 pages.
International Search Report and Written Opinion for Application No. PCT/JP2018/044677, dated Jan. 29, 2019, 7 pages.
International Search Report and Written Opinion for Application No. PCT/JP2018/044697, dated Jan. 12, 2019, 8 pages.

(Continued)

*Primary Examiner* — Shaojia A Jiang
*Assistant Examiner* — Everett White
(74) *Attorney, Agent, or Firm* — McCarter & English, LLP; Steven G. Davis; Wei Song

(57) ABSTRACT

Provided is a novel manufacturing method whereby a carboxymethylated cellulose nanofiber dispersion having high tarnasparency can be obtained economically. In carboxymethylation of cellulose in the present invention, mercerization is performed in water as the main solvent, after which carboxymethylation is performed in a solvent mixture of water and an organic solvent, By defibrating the resultant carboxymethylated cellulose, a carboxymethylated cellulose nanofiber dispersion having high transparency can be obtained economically.

15 Claims, No Drawings

(56) References Cited

FOREIGN PATENT DOCUMENTS

| | | | |
|---|---|---|---|
| JP | 2017-149901 A | 8/2017 | |
| JP | 6228707 B1 | 11/2017 | |
| JP | 6337225 B1 | 6/2018 | |
| JP | 6351821 B1 | 7/2018 | |
| JP | 6417490 B1 | 11/2018 | |
| JP | 6442106 B1 | 12/2018 | |
| WO | 2014/087767 A1 | 6/2014 | |
| WO | 2014/088072 A1 | 6/2014 | |
| WO | 2017/111016 A1 | 6/2017 | |
| WO | 2017/199924 A1 | 11/2017 | |
| WO | 2019/111933 A1 | 6/2019 | |
| WO | 2019/111934 A1 | 6/2019 | |
| WO | 2019/111939 A1 | 6/2019 | |
| WO | 2019/111941 A1 | 6/2019 | |

OTHER PUBLICATIONS

Liu et al., Preparation of Bamboo Nanofibrillated Cellulose with Carboxyl Groups by TEMPO-Mediated Oxidation. Journal of Cellulose Science and Technology. Sep. 2016;24(3):59-66.
Zhu et al., The Effect of Refining and Carboxymethyl Treatment on Morphology and Crystal Structure of Sugarcane Bagasse Fibers. Sugarcane and Canesugar. Oct. 2015;5:51-57.
U.S. Appl. No. 16/768,939, filed Jun. 2, 2020, 2021-0214465, Published.
U.S. Appl. No. 16/770,559, filed Jun. 5, 2020, 2021-0163629, Published.
U.S. Appl. No. 16/768,939, filed Jun. 2, 2020, U.S. Pat. No. 11,518,820 B2, Issued.
U.S. Appl. No. 16/768,945, filed Jun. 2, 2020, 2021-0214466, Published.
U.S. Appl. No. 16/769,666, filed Jun. 4, 2020, 2021-0180214, Published.
U.S. Appl. No. 16/770,559, filed Jun. 5, 2020, 2021-0163629, Allowed.

* cited by examiner

METHOD FOR MANUFACTURING CARBOXYMETHYLATED CELLULOSE NANOFIBER

CROSS-REFERENCE TO RELATED APPLICATIONS

This application is a U.S. national stage filing, under 35 U.S.C. § 371(c), of International Application No. PCT/JP2018/044677, filed on Dec. 5, 2018, which claims the benefit of priority to Japanese Patent Application No. 2017-235016, filed on Dec. 7, 2017, and Japanese Patent Application No. 2018-076540, filed on Apr. 12, 2018. The entire contents of each of the aforementioned applications are incorporated herein by reference.

TECHNICAL FIELD

The present invention relates to a novel method for producing a carboxymethylated cellulose nanofiber.

BACKGROUND ART

Carboxymethylated celluloses are cellulose derivatives, and are obtained by linking carboxymethyl groups to some of hydroxyl groups in glucose residues constituting cellulose backbones to form ether linkages. Increase in the amount of carboxymethyl groups (namely, increase in the degree of carboxymethyl substitution) allows carboxymethylated celluloses to be dissolved in water. On the other hand, adjusting the degree of carboxymethyl substitution to a proper range allows carboxymethylated celluloses to maintain fibrous shapes in water. A carboxymethylated cellulose having a fibrous shape can be mechanically defibrated and thus converted into a nanofiber having a nanoscale fiber diameter (PTL 1).

A commonly known method for producing carboxymethylated cellulose is a method including subjecting cellulose to an alkaline treatment (mercerization) and then a treatment with an etherifying agent (also referred to as "carboxymethylation agent") (carboxymethylation, also called "etherification"). In the method, there are two known processes, one of which includes performing both mercerization and carboxymethylation by using water as a solvent and another of which includes performing both mercerization and carboxymethylation in an organic solvent or a mixed solvent of an organic solvent and water (PTL 2), and the former is called "water mediated method" and the latter is called "solvent mediated method".

A known method for producing a cellulose nanofiber having a nanoscale fiber diameter is, for example, not only mechanical defibration of carboxymethylated cellulose, but also mechanical defibration of a cellulose into which carboxyl groups have been introduced (PTL 3). A water dispersion of a cellulose nanofiber obtained by defibration of such a carboxylated cellulose is known to be high in transparency. On the other hand, a water dispersion of a cellulose nanofiber obtained by defibration of a carboxymethylated cellulose obtained by a solvent mediated method is low in transparency as compared with a water dispersion of a cellulose nanofiber obtained by defibration of a carboxylated cellulose. For obtaining a water dispersion of a cellulose nanofiber with enhanced transparency by defibration of a carboxymethylated cellulose obtained by a water mediated method, a large amount of chemical agents such as a mercerizing agent and/or a carboxymethylation agent is needed, which has large problems with production and economy. Transparent materials are suitable for various applications and therefore it is demanded that cellulose nanofibers are transparent. In particular, carboxymethylated celluloses are materials high in safety and thus it is demanded to obtain a cellulose nanofiber high in transparency by use of carboxymethylated cellulose in an economic manner.

CITATION LIST

Patent Literature

PTL 1: International Publication No. WO 2014/088072
PTL 2: Japanese Patent Laid-Open No. 2017-149901
PTL 3: Japanese Patent Laid-Open No. 2008-1728

SUMMARY OF INVENTION

Technical Problem

An object of the present invention is to provide a novel production method which provides a carboxymethylated cellulose nanofiber dispersion high in transparency.

Solution to Problem

The present inventors have made intensive studies to achieve the above object, and as a result, have found that when mercerization (alkaline treatment of cellulose) in a solvent containing mainly water is followed by carboxymethylation (also referred to as "etherification") in a mixed solvent of water and an organic solvent in carboxymethylation of cellulose, a carboxymethylated cellulose which can be used to form a cellulose nanofiber dispersion very high in transparency by defibration, can be produced at a high rate of effective utilization of a carboxymethylation agent in an economic manner, as compared with any carboxymethylated cellulose obtained according to a conventional water mediated method (method including performing both mercerization and carboxymethylation in water as a solvent) or solvent mediated method (method including performing both mercerization and carboxymethylation in an organic solvent or in a mixed solvent of water and an organic solvent).

The present invention provides the following, but is not limited thereto.

(1) A method for producing a carboxymethylated cellulose nanofiber, the method comprising:
treating cellulose with a mercerizing agent to prepare mercerized cellulose;
reacting the mercerized cellulose with a carboxymethylation agent to prepare carboxymethylated cellulose; and
defibrating the carboxymethylated cellulose to produce a carboxymethylated cellulose nanofiber; wherein
preparing mercerized cellulose is performed in a solvent containing mainly water, and preparing carboxymethylated cellulose is performed in a mixed solvent of water and an organic solvent.

(2) The method according to (1), wherein the solvent containing mainly water in preparing mercerized cellulose is a solvent containing higher than 50% by mass of water.

(3) The method according to (2), wherein the solvent containing mainly water in preparing mercerized cellulose is water.

(4) The method according to any one of (1) to (3), wherein a rate of effective utilization of the carboxymethylation agent is 15% or more.

(5) The method according to any one of (1) to (4), wherein the mercerizing agent comprises sodium hydroxide, lithium hydroxide, potassium hydroxide, or a combination of two or more thereof.

(6) The method according to any one of (1) to (5), wherein the carboxymethylation agent comprises monochloroacetic acid or sodium monochloroacetate.

(7) The method according to any one of (1) to (6), wherein the mixed solvent in preparing the carboxymethylated cellulose is a solvent containing 20 to 99% by mass of an organic solvent.

(8) The method according to any one of (1) to (7), wherein the organic solvent comprises isopropanol, methanol, ethanol, acetone, or a combination of two or more thereof.

(9) The method according to any one of (1) to (8), wherein a degree of carboxymethyl substitution per anhydrous glucose unit in the carboxymethylated cellulose is less than 0.50.

(10) The method according to any one of (1) to (9), wherein a degree of crystallization of cellulose I type in the carboxymethylated cellulose is 50% or more.

Effects of Invention

The method of the present invention can produce a carboxymethylated cellulose at a high rate of effective utilization of a carboxymethylation agent, the carboxymethylated cellulose forming a cellulose nanofiber dispersion very high in transparency by defibration.

DESCRIPTION OF EMBODIMENTS

The present invention relates to a method for producing a carboxymethylated cellulose nanofiber. The carboxymethylated cellulose has a structure formed by linking carboxymethyl groups to some of hydroxyl groups in glucose residues constituting cellulose. The carboxymethylated cellulose may be in the form of a salt, and examples of the salt of the carboxymethylated cellulose include metal salts such as a carboxymethylated cellulose sodium salt.

Carboxymethylated celluloses can be commonly produced by subjecting cellulose to an alkaline treatment (mercerization), and thereafter allowing the resulting mercerized cellulose (also referred to as "alkaline cellulose") to react with a carboxymethylation agent (also referred to as "etherifying agent").

<Cellulose>

The cellulose in the present invention means polysaccharide having a structure in which D-glucopyranoses (D-glucopyranose is also simply referred to as "glucose residue" or "anhydrous glucose") are connected by β-1,4 linkages. Celluloses are commonly classified to, for example, native cellulose, regenerated cellulose, fine cellulose, and microcrystalline cellulose from which an amorphous region is removed, depending on the source, the production method, and the like. Any of such celluloses can be used as a raw material of the mercerized cellulose in the present invention.

Examples of the native cellulose include bleached pulp and unbleached pulp (bleached wood pulp or unbleached wood pulp); linter and refined linter; and cellulose produced by microorganisms such as acetic acid bacteria. The raw material of the bleached pulp or unbleached pulp is not limited, and examples thereof include wood, cotton, straw, bamboo, hemp, jute, and kenaf. The method for producing the bleached pulp or unbleached pulp is also not particularly limited, and may be a mechanical method, a chemical method, or a combined intermediate method between these two methods. Examples of the bleached pulp or unbleached pulp classified according to the production method include mechanical pulp (thermomechanical pulp (TMP), groundwood pulp), chemical pulp (sulfite pulp such as needle (softwood) unbleached sulfite pulp (NUSP), and needle bleached sulfite pulp (NBSP), and kraft pulp such as needle unbleached kraft pulp (NUKP), needle bleached kraft pulp (NBKP), leaf (hardwood) unbleached kraft pulp (LUKP), and leaf bleached kraft pulp (LBKP)). Dissolving pulp may also be used, besides papermaking pulp. Dissolving pulp is pulp chemically refined, is mainly used in a dissolved state in chemicals, and serves as a main raw material of an artificial fiber, cellophane, or the like.

Examples of the regenerated cellulose include one obtained by dissolving cellulose in a solvent such as a cuprammonium solution, a cellulose xanthate solution, or a morpholine derivative, and anew subjecting the resultant to spinning. Examples of the fine cellulose include one obtained by subjecting a cellulose material such as the native cellulose or regenerated cellulose to a depolymerization treatment (for example, acid hydrolysis, alkali hydrolysis, enzymatic degradation, a blasting treatment, or a vibration ball mill treatment), and one obtained by mechanically treating the cellulose-based material.

<Mercerization>

The mercerized cellulose (also referred to as "alkaline cellulose") is obtained by using the above cellulose as a raw material and adding a mercerizing agent (alkali) thereto. In the present invention, a carboxymethylated cellulose which can be defibrated to form a cellulose nanofiber dispersion very high in transparency can be provided in an economic manner, by use of water as a solvent in a mercerization reaction and a mixed solvent of an organic solvent and water in the next carboxymethylation.

"Using mainly water as a solvent (solvent containing mainly water)" refers to using a solvent containing water in an amount of higher than 50% by mass. The solvent containing mainly water preferably contains 55% by mass or more, more preferably 60% by mass or more, more preferably 70% by mass or more, more preferably 80% by mass or more, further preferably 90% by mass or more, further preferably 95% by mass or more of water. The solvent containing mainly water particularly preferably contains 100% by mass of water (namely, is water). As the proportion of water in mercerization is higher, the transparency of a cellulose nanofiber dispersion obtained by defibrating the carboxymethylated cellulose is higher. Examples of the solvent (which is mixed with water when use) other than water in the solvent containing mainly water include an organic solvent used as a solvent in carboxymethylation of the later stage. Examples can include alcohols such as methanol, ethanol, n-propyl alcohol, isopropyl alcohol, n-butanol, isobutanol, and tert-butanol, ketones such as acetone, diethyl ketone, and methyl ethyl ketone, and dioxane, diethyl ether, benzene and dichloromethane. These can be used singly or in the form of a mixture of two or more thereof, and be added to water in an amount of less than 50% by mass, as a solvent for mercerization. The solvent containing mainly water preferably contains 45% by mass or less, further preferably 40% by mass or less, further preferably 30% by mass or less, further preferably 20% by mass or less, further preferably 10% by mass or less, further preferably 5% by mass or less, more preferably 0% by mass of the organic solvent.

Examples of the mercerizing agent include alkali metal hydroxides such as lithium hydroxide, sodium hydroxide, and potassium hydroxide, and these can be used singly or in combinations of any two or more thereof. The mercerizing agent is not limited thereto, but such an alkali metal hydroxide can be added to a reactor, for example, in the form of an aqueous solution having a content of the alkali metal hydroxide of 1 to 60% by mass, preferably 2 to 45% by mass, more preferably 3 to 25% by mass. The amount of the mercerizing agent used is preferably 0.1 mol or more and 2.5 mol or less, more preferably 0.3 mol or more and 2.0 mol or less, further preferably 0.4 mol or more and 1.5 mol or less, per 100 g of cellulose (absolute dry), in one embodiment.

The amount of the solvent containing mainly water in mercerization may be any amount as long as a raw material can be stirred and mixed, and is not particularly limited, and the amount thereof is preferably as large as that of cellulose as a raw material, in terms of mass.

A mercerization treatment is performed by mixing a starting raw material (cellulose) and the solvent containing mainly water, adjusting the temperature of a reactor to 0 to 70° C., preferably 10 to 60° C., more preferably 10 to 40° C., adding an aqueous solution of a mercerizing agent, and stirring the resultant for 15 minutes to 8 hours, preferably 30 minutes to 7 hours, more preferably 30 minutes to 3 hours. Thus, the mercerized cellulose (alkaline cellulose) is obtained.

The pH in mercerization is preferably 9 or more, and thus the mercerization reaction can progress. The pH is more preferably 11 or more, further preferably 12 or more, and may be 13 or more. The upper limit of the pH is not particularly limited.

Such mercerization can be performed by use of a reactor in which the above respective components can be mixed and stirred while controlling the temperature, and any of various reactor conventionally used in a mercerization reaction can be used. For example, a batch type stirred reactor in which two screws are used to stir and mix the components is preferable in view of uniform mixing ability and also productivity.

<Carboxymethylation>

The carboxymethylated cellulose is obtained by adding a carboxymethylation agent (also referred to as "etherifying agent") to the mercerized cellulose. In the present invention, a mixed solvent of water and an organic solvent is used as a solvent in a carboxymethylation reaction. A carboxymethylated cellulose which can be defibrated to form a cellulose nanofiber dispersion very high in transparency can be obtained in an economic manner, by use of a solvent containing mainly water in mercerization and a mixed solvent of water and an organic solvent in carboxymethylation.

Examples of the carboxymethylation agent include monochloroacetic acid, sodium monochloroacetate, methyl monochloroacetate, ethyl monochloroacetate, and isopropyl monochloroacetate. In particular, monochloroacetic acid or sodium monochloroacetate is preferable in terms of their availability. The carboxymethylation agent is preferably added in an amount ranging from 0.5 to 1.5 mol per anhydrous glucose unit of cellulose. The lower limit of the range is more preferably 0.6 mol or more, further preferably 0.7 mol or more, and the upper limit in the range is more preferably 1.3 mol or less, further preferably 1.1 mol or less. The carboxymethylation agent can be added to a reactor, for example, but not limited to, in the form of an aqueous solution having a content of the carboxymethylation agent of 5 to 80% by mass, more preferably 30 to 60% by mass, and can also be added in the form of a powder without any dissolution.

The molar ratio of the mercerizing agent to the carboxymethylation agent (mercerizing agent/carboxymethylation agent) generally adopted is 0.90 to 2.45 in a case where monochloroacetic acid or sodium monochloroacetate is used as the carboxymethylation agent. The reason for this is as follows: a molar ratio of less than 0.90 can cause a carboxymethylation reaction to insufficiently progress, resulting in remaining of the unreacted monochloroacetic acid or sodium monochloroacetate and thus diseconomy, and a molar ratio of more than 2.45 may cause a side reaction of an excess of the mercerizing agent with monochloroacetic acid or sodium monochloroacetate to progress, resulting in production of a glycolic acid alkali metal salt and thus diseconomy.

In the present invention, the rate of effective utilization of the carboxymethylation agent is preferably 15% or more, more preferably 20% or more, further preferably 25% or more, particularly preferably 30% or more. The rate of effective utilization of the carboxymethylation agent refers to the proportion of carboxymethyl groups introduced into cellulose to carboxymethyl groups in the carboxymethylation agent. The present invention can provide a carboxymethylated cellulose which can be defibrated to form a cellulose nanofiber dispersion high in transparency, at a high rate of effective utilization of the carboxymethylation agent (namely, in an economic manner without use of large amount of the carboxymethylation agent), by use of a solvent containing mainly water in mercerization and a mixed solvent of water and an organic solvent in carboxymethylation. The upper limit of the rate of effective utilization of the carboxymethylation agent is not particularly limited, and the upper limit is actually about 80%. The rate of effective utilization of the carboxymethylation agent may be herein abbreviated as AM.

The method for calculating the rate of effective utilization of the carboxymethylation agent is as follows:

$$AM = (DS \times \text{Number of moles of cellulose})/\text{Number of moles of carboxymethylation agent}$$

DS: Degree of carboxymethyl substitution (the measurement method will be described below)
Number of moles of cellulose: Mass of pulp (Dry mass after drying at 100° C. for 60 minutes)/162
(162 means the molecular weight per glucose unit of cellulose).

The concentration of the raw material of cellulose in the carboxymethylation reaction is not particularly limited, and is preferably 1 to 40% (w/v) in view of an enhancement in rate of effective utilization of the carboxymethylation agent.

A mixed solvent of water and an organic solvent is formed by appropriately adding an organic solvent or an aqueous solution of an organic solvent to the reactor, or alternatively, appropriately reducing the organic solvent other than water for the mercerization treatment, for example, under reduced pressure, at the same time as of addition of the carboxymethylation agent or before or immediately after addition of the carboxymethylation agent. The carboxymethylation reaction is allowed to progress in the mixed solvent of water and an organic solvent in the present invention. The timing of addition or reduction of the organic solvent is not particularly limited as long as it is within the time from completion of the mercerization reaction to immediately after addition of the carboxymethylation agent, and is preferably, for example, within 30 minutes before or after addition of the carboxymethylation agent.

Examples of the organic solvent include alcohols such as methanol, ethanol, n-propyl alcohol, isopropyl alcohol, n-butanol, isobutanol, and tert-butanol, ketones such as acetone, diethyl ketone, and methyl ethyl ketone, and dioxane, diethyl ether, benzene and dichloromethane. These can be used singly or in the form of a mixture of two or more thereof, and be added to water as a solvent for carboxymethylation. In particular, a monohydric alcohol having 1 to 4 carbon atoms is preferable, and a monohydric alcohol having 1 to 3 carbon atoms is further preferable, because compatibility with water is excellent.

The content of the organic solvent in the mixed solvent for carboxymethylation is preferably 20 to 99% by mass, more preferably 30 to 99% by mass, further preferably 40 to 99% by mass, further preferably 45 to 99% by mass based on the total of water and the organic solvent.

The reaction medium (the mixed solvent of water and the organic solvent, containing no cellulose) for carboxymethylation preferably has a lower water content (in other words, a higher organic solvent content) than the reaction medium for mercerization. When the above range is satisfied, the degree of crystallization of the resulting carboxymethylated cellulose can be easily maintained while the degree of carboxymethyl substitution is also easily increased, and thus a carboxymethylated cellulose which can be defibrated to form a cellulose nanofiber dispersion high in transparency can be more efficiently obtained. In a case where the reaction medium for carboxymethylation has a lower water content (a higher organic solvent content) than the reaction medium for mercerization, the mixed solvent for the carboxymethylation reaction can be advantageously formed by a simple procedure in which a desired amount of the organic solvent is added to the reaction system after completion of the mercerization reaction, in transferring from the mercerization reaction to the carboxymethylation reaction.

The mixed solvent of water and an organic solvent is thus formed, the carboxymethylation agent is added to the mercerized cellulose, and then the resultant is stirred for about 15 minutes to 4 hours, preferably about 15 minutes to 1 hour while the temperature is preferably kept constantly in the range from 10 to 40° C. Mixing of a liquid containing the mercerized cellulose with the carboxymethylation agent is preferably performed by adding the carboxymethylation agent in portions or dropwise, in view of preventing the reaction mixture from being at a high temperature. After the carboxymethylation agent is added, the resulting mixture was stirred for a certain time, and the temperature thereof is, if necessary, raised. An etherification (carboxymethylation) reaction is then performed at a reaction temperature of 30 to 90° C., preferably 40 to 90° C., further preferably 60 to 80° C. for 30 minutes to 10 hours, preferably 1 hour to 4 hours, thereby obtaining the carboxymethylated cellulose.

The reactor which has been used in mercerization may be used as it is, or another reactor in which the components can be mixed and stirred while controlling the temperature may be used, in carboxymethylation.

After completion of the reaction, the remaining alkali metal salt may be neutralized with a mineral acid or organic acid. If necessary, an inorganic salt, an organic acid salt, and others as by-product(s) may be removed by washing with water-containing methanol, and the resultant may be dried, pulverized and classified to form the carboxymethylated cellulose or the salt thereof. Examples of an apparatus for use in dry pulverization include impact mills such as a hammer mill and a pin mill, medium mills such as a ball mill and a tower mill, and jet mills. Examples of an apparatus for use in wet pulverization include apparatuses such as a homogenizer, a masscolloider, and a pearl mill.

<Carboxymethylated Cellulose>

A carboxymethylated cellulose produced according to the present invention preferably maintains at least a portion of a fibrous shape, when dispersed in water. Specifically, it is preferable that a fibrous substance is found in observation of a water dispersion of the carboxymethylated cellulose with an electron microscope, and that a peak of a cellulose I type crystal is exhibited in observation of the carboxymethylated cellulose with X-ray diffraction.

The carboxymethylated cellulose maintaining at least a portion of a fibrous shape, when dispersed in water, has a degree of carboxymethyl substitution per anhydrous glucose unit of cellulose of less than 0.50. In a case where the degree of substitution is 0.50 or more, dissolution in water easily occurs to fail to maintain a fibrous form. The degree of substitution is particularly preferably 0.02 or more and less than 0.50, further preferably 0.05 or more and less than 0.50, further preferably 0.10 or more and 0.40 or less, further preferably 0.20 or more and 0.40 or less in consideration of operationability. By introducing carboxymethyl groups into celluloses, electrical repulsion of the celluloses occurs, and thus the resulting celluloses can be defibrated to nanofibers; however, when the degree of carboxymethyl substitution per anhydrous glucose unit is less than 0.02, defibration into nanofibers may be insufficiently. The degree of carboxymethyl substitution can be adjusted by controlling the amount of a carboxymethylation agent for reaction to be added, the amount of a mercerizing agent, and the compositional ratio between water and an organic solvent.

The anhydrous glucose unit in the present invention means individual anhydrous glucose (glucose residue) constituting cellulose. The degree of carboxymethyl substitution (also referred to as "degree of etherification") herein represents the proportion of hydroxyl groups replaced with carboxymethyl ether groups among hydroxyl groups of the glucose residue constituting cellulose (the number of carboxymethyl ether groups per glucose residue). The degree of carboxymethyl substitution may be abbreviated as DS.

The method for measuring the degree of carboxymethyl substitution is as follows: About 2.0 g of a sample is precisely weighed and is put in a 300-mL stoppered conical flask. 100 mL of a liquid obtained by adding 100 mL of nitric acid (special grade) to 1000 mL of nitric acid/methanol is added thereto and the resulting flask was shaken for 3 hours, thereby converting the salt of the carboxymethylated cellulose (CMC) into H-CMC (hydrogen-type carboxymethylated cellulose). 1.5 to 2.0 g of the absolute dry H-CMC is precisely weighed, and put in a 300-mL stoppered conical flask. The H-CMC is wetted with 15 mL of 80% methanol. 100 mL of 0.1 N—NaOH is added thereto, and the resulting flask was shaken at room temperature for 3 hours. Phenolphthalein is used as an indicator to reversely titrate excess NaOH by 0.1 N—$H_2SO_4$, and the degree of carboxymethyl substitution (DS value) is calculated according to the following expressions.

$$A=[(100\times F'-0.1 \text{ N}-H_2SO_4(\text{mL})\times F)\times 0.1]/(\text{Absolute dry mass (g) of H-CMC})$$

$$\text{Degree of carboxymethyl substitution}=0.162\times A/(1-0.058\times A)$$

F': factor of 0.1 N—$HSO_4$
F: factor of 0.1 N—NaOH.

The degree of crystallization of cellulose in the carboxymethylated cellulose fiber of the present invention is preferably 50% or more, more preferably 60% or more, with respect to crystal I type. When the crystallinity is within the above range, transparency of a cellulose nanofiber dispersion obtained by defibration is enhanced. The crystallinity of cellulose can be controlled by the concentration of a mercerizing agent and the temperature in treatment, as well as the degree of carboxymethylation. An alkali at a high concentration is used in mercerization and carboxymethylation to thereby allow a I type crystal of cellulose to be easily converted into a II type crystal; however, for example, the amount of the alkali (mercerizing agent) used can be adjusted to adjust the degree of denaturation, thereby allowing desired crystallinity to be maintained.

The method for measuring the degree of crystallization of cellulose I type of the carboxymethylated cellulose is as follows:

A sample is placed on a glass cell, and subjected to measurement with an X-ray diffractometer (LabX XRD-6000, manufactured by Shimadzu Corporation). The degree of crystallization is calculated according to a procedure of Segal, et al., and is calculated from the diffraction intensity of the 002 plane at $2\theta=22.6°$ and the diffraction intensity of an amorphous portion at $2\theta=18.5°$ with the diffraction intensity at $2\theta=10°$ to $30°$ as the baseline in an X-ray diffraction diagram, according to the following expressions.

$$Xc=(I002c-Ia)/I002c\times100$$

Xc=degree (%) of crystallization of cellulose I type
I002c: diffraction intensity of 002 plane at $2\theta=22.6°$
Ia: diffraction intensity of amorphous portion at $2\theta=18.5°$.

A carboxymethylated cellulose produced by the present invention can be used in the state of a dispersion obtained after the reaction, or can be, if necessary, dried, and re-dispersed in water before use. The drying method is not limited at all, and for example, any known method such as a freeze-drying method, a spray-drying method, a shelf-type drying method, a drum drying method, a belt drying method, a drying method including thinly extending on a glass plate or the like, a fluid-bed drying method, a microwave drying method, or a drying method including using heat generating fan under reduced pressure can be used. After drying, the resultant may be, if necessary, pulverized by a cutter mill, a hammer mill, a pin mill, a jet mill, or the like. The method for re-dispersing in water is also not particularly limited, and any known dispersing apparatus can be used.

<Production of Carboxymethylated Cellulose Nanofiber>

A carboxymethylated cellulose obtained by the method of the present invention can be converted by defibration into a cellulose nanofiber having a nanoscale fiber diameter. A carboxymethylated cellulose nanofiber obtained by the method of the present invention can be produced in an economic manner and has a high transparency in the state of a water dispersion, as compared with a carboxymethylated cellulose nanofiber obtained by a conventional water mediated method or solvent mediated method.

Before defibration, a dispersion of the carboxymethylated cellulose obtained by the method is prepared. A dispersing medium is preferably water in terms of ease of handling. The concentration of the carboxymethylated cellulose is preferably 0.01 to 10% (w/v) in consideration of defibration and dispersing efficiencies.

The apparatus for use in defibration of the carboxymethylated cellulose is not particularly limited, and, for example, a high-speed rotation type, colloide mill type, high pressure type, roll mill type, or ultrasound type apparatus can be used. It is preferable to apply a strong shear force to the dispersion of the carboxymethylated cellulose in defibration. Particularly, it is preferable for efficient defibration to use a wet high-pressure or ultra-high-pressure homogenizer which can apply a pressure of 50 MPa or more to the dispersion and can apply a strong shear force. The pressure is more preferably 100 MPa or more, further preferably 140 MPa or more. The dispersion may be subjected to, if necessary, a pre-treatment with known mixing, stirring, emulsifying, and/or dispersing apparatus(es), such as a high-speed shear mixer, prior to a defibration and dispersing treatment by a high-pressure homogenizer.

The high-pressure homogenizer is an apparatus which performs emulsifying, dispersing, defibrating, pulverizing, and ultra-fining with total energy of particle collision, a shear force due to the difference in pressure, and the like by subjecting a fluid to pressurizing (high pressure) by a pump and thus ejecting the fluid through a very fine gap provided in a passage.

Defibration of the carboxymethylated cellulose can provide a carboxymethylated cellulose nanofiber having an average fiber diameter of 3 to 500 nm and an aspect ratio of 50 or more. The average fiber diameter is preferably 3 to 150 nm, further preferably 3 to 20 nm, further preferably 5 to 19 nm, further preferably 5 to 15 nm.

The average fiber diameter and the average fiber length of the carboxymethylated cellulose or the carboxymethylated cellulose nanofiber can be each determined by analyzing 200 fibers randomly selected, with an atomic force microscope (AFM) in the case of a diameter of 20 nm or less or with a field emission scanning electron microscope (FE-SEM) in the case of a diameter of 20 nm or more, and calculating the average. The aspect ratio can be calculated according to the following expression:

$$\text{Aspect ratio}=\text{Average fiber length/Average fiber diameter.}$$

The degree of carboxymethyl substitution of the carboxymethylated cellulose nanofiber is generally the same as the degree of carboxymethyl substitution of the carboxymethylated cellulose before formation of the nanofiber. The proportion of the I type crystal of the carboxymethylated cellulose nanofiber is generally the same as that of the carboxymethylated cellulose before formation of the nanofiber.

The method of the present invention can provide a cellulose nanofiber dispersion of the carboxymethylated cellulose with high transparency. The transparency (transmittance of light at 660 nm) of a water dispersion having a solid content of, for example, 1% (w/v), of a carboxymethylated cellulose nanofiber obtained according to the present invention is 50% or more, more preferably 60% or more, further preferably 70% or more, further preferably 80% or more, further preferably 90% or more. Such a cellulose nanofiber can be optimally used in an application which requires transparency. The present invention can produce such a cellulose nanofiber high in transparency, at a high rate of effective utilization of the carboxymethylation agent (namely, in an economic manner without significant increase in amount of the carboxymethylation agent).

While the reason why the production method of the present invention can provide a cellulose nanofiber high in transparency in an economic manner is not clear, the present inventors has confirmed that the production method of the present invention enables maintaining a relatively high degree of crystallization of cellulose I type and therefore enables maintaining a fibrous shape of carboxymethylated cellulose even at a relatively high degree of carboxymethyl substitution. It is considered that a high degree of carboxymethyl substitution (namely, introduction of many carboxylmethyl groups) with the fibrous shape being maintained leads to an enhancement in defibrating properties of carboxymethylated cellulose, and this is probably one reason why a nanofiber dispersion high in transparency is obtained. However, reasons other than the above are not excluded.

EXAMPLES

Hereinafter, the present invention will be more specifically described with reference to Examples and Comparative Examples, but the present invention is not intended to be limited thereto. Unless particularly noted, "part(s)" and "%" represent "part(s) by mass" and "% by mass".

Example 1

To a twin-screw kneader whose rotational speed was modulated to 100 rpm, were added 130 parts of water and a solution of 20 parts of sodium hydroxide in 100 parts of water, and hardwood pulp (LBKP manufactured by Nippon Paper Industries Co., Ltd.) was added thereto in an amount of 100 parts in terms dry mass when dried at 100° C. for 60 minutes. The resultant was stirred and mixed at 30° C. for 90 minutes, to prepare mercerized cellulose. Furthermore, 230 parts of isopropanol (IPA) and 60 parts of sodium monochloroacetate were added thereto while stirring. The resultant was stirred for 30 minutes, and the temperature was raised to 70° C. to allow a carboxymethylation reaction to occur for 90 minutes. The concentration of IPA in a reaction medium in the carboxymethylation reaction was 50%. After completion of the reaction, the resultant was subjected to neutralization, liquid removal, drying, and pulverization, thereby obtaining a carboxymethylated cellulose sodium salt which had a degree of carboxymethyl substitution of 0.31 and a degree of crystallization of cellulose I type of 67%. The rate of effective utilization of the carboxymethylation agent was 37%. The methods for measuring the degree of carboxymethyl substitution and the degree of crystallization of cellulose I type, and the method for calculating the rate of effective utilization of the carboxymethylation agent are as described above.

The resulting carboxymethylated cellulose sodium salt was dispersed in water to form a 1% (w/v) water dispersion. The water dispersion was treated by a high-pressure homogenizer at 150 MPa three times, thereby obtaining a carboxymethylated cellulose nanofiber dispersion. The transparency and the viscosity of the resulting dispersion were measured according to the following methods.

<Measurement of Transparency of Cellulose Nanofiber Dispersion>

The transparency (transmittance of light at 660 nm) of the cellulose nanofiber dispersion (solid content: 1% (w/v), dispersing medium: water) was measured with a UV-VIS spectrophotometer UV-1800 (manufactured by Shimadzu Corporation).

<Measurement of Viscosity>

The cellulose nanofiber dispersion (solid content: 1% (w/v), dispersing medium: water) was left to still stand at 25° C. for 16 hours, and thereafter stirred using a stirring machine at 3000 rpm for 1 minute, and the viscosity was measured with a No. 4 rotor at a rotational speed of 60 rpm or 6 rpm after 3 minutes by use of a B-type viscometer (manufactured by Toki Sangyo Co., Ltd).

Example 2

A carboxymethylated cellulose sodium salt was obtained in the same manner as in Example 1 except that the amount of IPA added was changed to thereby change the concentration of IPA in the reaction liquid in the carboxymethylation reaction to 90%. The degree of carboxymethyl substitution was 0.47, the degree of crystallization of cellulose I type was 63%, and the rate of effective utilization of the carboxymethylation agent was 56%.

The resulting carboxymethylated cellulose sodium salt was defibrated in the same manner as in Example 1, thereby obtaining a carboxymethylated cellulose nanofiber dispersion.

Example 3

A carboxymethylated cellulose sodium salt was obtained in the same manner as in Example 1 except that the solvent in the mercerization reaction was of 90% of water and 10% of IPA and the amount of IPA added was changed to thereby allow the concentration of IPA in the mixed solvent in the carboxymethyl reaction to be adjusted to 50% as in Example 1. The degree of carboxymethyl substitution was 0.28, the degree of crystallization of cellulose I type was 69%, and the rate of effective utilization of the carboxymethylation agent was 34%. The resulting carboxymethylated cellulose sodium salt was defibrated in the same manner as in Example 1, thereby obtaining a carboxymethylated cellulose nanofiber dispersion.

Example 4

A carboxymethylated cellulose sodium salt was obtained in the same manner as in Example 1, except that the solvent for the mercerization reaction contained 70% of water and 30% of IPA and the amount of IPA added was changed to thereby allow the concentration of IPA in the mixed solvent in the carboxymethyl reaction to be adjusted to 50% as in Example 1. The degree of carboxymethyl substitution was 0.28, the degree of crystallization of cellulose I type was 64%, and the rate of effective utilization of the carboxymethylation agent was 34%. The resulting carboxymethylated cellulose sodium salt was defibrated in the same manner as in Example 1, thereby obtaining a carboxymethylated cellulose nanofiber dispersion.

Example 5

A carboxymethylated cellulose lithium salt was obtained in the same manner as in Example 1 except that lithium hydroxide was used as the mercerizing agent instead of sodium hydroxide. The degree of carboxymethyl substitution was 0.25, the degree of crystallization of cellulose I type was 62%, and the rate of effective utilization of the carboxymethylation agent was 30%. The resulting carboxymethylated cellulose lithium salt was defibrated in the same manner as in Example 1, thereby obtaining a carboxymethylated cellulose nanofiber dispersion.

Example 6

A carboxymethylated cellulose potassium salt was obtained in the same manner as in Example 1 except that potassium hydroxide was used as the mercerizing agent instead of sodium hydroxide. The degree of carboxymethyl substitution was 0.25, the degree of crystallization of cellulose I type was 61%, and the rate of effective utilization of the carboxymethylation agent was 30%. The resulting carboxymethylated cellulose potassium salt was defibrated in the same manner as in Example 1, thereby obtaining a carboxymethylated cellulose nanofiber dispersion.

Example 7

A carboxymethylated cellulose sodium salt was obtained in the same manner as in Example 1 except that the organic solvent added in the carboxymethylation reaction was changed from IPA to methanol. The degree of carboxymethyl substitution was 0.29, the degree of crystallization of cellulose I type was 66%, and the rate of effective utilization of the carboxymethylation agent was 35%. The resulting carboxymethylated cellulose sodium salt was defibrated in the same manner as in Example 1, thereby obtaining a carboxymethylated cellulose nanofiber dispersion.

Example 8

A carboxymethylated cellulose sodium salt was obtained in the same manner as in Example 1 except that the organic solvent added in the carboxymethylation reaction was changed from IPA to ethanol. The degree of carboxymethyl substitution was 0.30, the degree of crystallization of cellulose I type was 67%, and the rate of effective utilization of the carboxymethylation agent was 36%. The resulting carboxymethylated cellulose sodium salt was defibrated in the same manner as in Example 1, thereby obtaining a carboxymethylated cellulose nanofiber dispersion.

Example 9

A carboxymethylated cellulose sodium salt was obtained in the same manner as in Example 1 except that the organic solvent added in the carboxymethylation reaction was changed from IPA to acetone. The degree of carboxymethyl substitution was 0.26, the degree of crystallization of cellulose I type was 63%, and the rate of effective utilization of the carboxymethylation agent was 31%. The resulting carboxymethylated cellulose sodium salt was defibrated in the same manner as in Example 1, thereby obtaining a carboxymethylated cellulose nanofiber dispersion.

Example 10

A carboxymethylated cellulose sodium salt was obtained in the same manner as in Example 1 except that a solution with 40 parts of sodium hydroxide in 100 parts of water was used instead of the solution with 20 parts of sodium hydroxide in 100 parts of water in the mercerization reaction and 50 parts of monochloroacetic acid was used instead of 60 parts of sodium monochloroacetate as the carboxymethylation agent in the carboxymethylation reaction. The degree of carboxymethyl substitution was 0.31, the degree of crystallization of cellulose I type was 60%, and the rate of effective utilization of the carboxymethylation agent was 36%. The resulting carboxymethylated cellulose sodium salt was defibrated in the same manner as in Example 1, thereby obtaining a carboxymethylated cellulose nanofiber dispersion.

Example 11

A carboxymethylated cellulose sodium salt was obtained in the same manner as in Example 1 except that the amount of IPA added was changed to thereby change the concentration of IPA in the reaction liquid in the carboxymethylation reaction to 30%. The degree of carboxymethyl substitution was 0.24, the degree of crystallization of cellulose I type was 73%, and the rate of effective utilization of the carboxymethylation agent was 29%. The resulting carboxymethylated cellulose sodium salt was defibrated in the same manner as in Example 1, thereby obtaining a carboxymethylated cellulose nanofiber dispersion.

Example 12

A carboxymethylated cellulose sodium salt was obtained in the same manner as in Example 1 except that the amount of IPA added was changed to thereby change the concentration of IPA in the reaction liquid in the carboxymethylation reaction to 20%. The degree of carboxymethyl substitution was 0.20, the degree of crystallization of cellulose I type was 74%, and the rate of effective utilization of the carboxymethylation agent was 24%. The resulting carboxymethylated cellulose sodium salt was defibrated in the same manner as in Example 1, thereby obtaining a carboxymethylated cellulose nanofiber dispersion.

Comparative Example 1

A carboxymethylated cellulose sodium salt was obtained in the same manner as in Example 1 except that the solvent for the carboxymethylation reaction was of 100% of water. The degree of carboxymethyl substitution was 0.11, the degree of crystallization of cellulose I type was 72%, and the rate of effective utilization of the carboxymethylation agent was 13%. The resulting carboxymethylated cellulose sodium salt was defibrated in the same manner as in Example 1, thereby obtaining a carboxymethylated cellulose nanofiber dispersion.

Comparative Example 2

A carboxymethylated cellulose sodium salt was obtained in the same manner as in Example 1 except that the solvent for the mercerization reaction contained 10% of water and 90% of IPA and, and that a solvent having the same composition was also used in the carboxymethylation reaction. The degree of carboxymethyl substitution was 0.27, the degree of crystallization of cellulose I type was 64%, and the rate of effective utilization of the carboxymethylation agent was 32%. The resulting carboxymethylated cellulose sodium salt was defibrated in the same manner as in Example 1, thereby obtaining a carboxymethylated cellulose nanofiber dispersion.

Comparative Example 3

A carboxymethylated cellulose sodium salt was obtained in the same manner as in Comparative Example 1 except that a solution of 45 parts of sodium hydroxide in 100 parts of water was used instead of the solution of 20 parts of sodium hydroxide in 100 parts of water in the mercerization reaction and that 150 parts of sodium monochloroacetate was used instead of 60 parts of sodium monochloroacetate as the carboxymethylation agent in the carboxymethylation reaction. The degree of carboxymethyl substitution was 0.28, the degree of crystallization of cellulose I type was 45%, and the rate of effective utilization of the carboxymethylation agent was 13%. The resulting carboxymethylated cellulose sodium salt was defibrated in the same manner as in Example 1, thereby obtaining a carboxymethylated cellulose nanofiber dispersion.

TABLE 1

| | Carboxymethylated cellulose | | | | | | |
|---|---|---|---|---|---|---|---|
| | Mercerization | | | Carboxymethylation | | | |
| | | Solvent | | | Solvent | | Degree of |
| | Mercerizing agent | Water | Organic solvent | Carboxymethylation agent | Water | Organic solvent | carboxymethyl substitution |
| Example 1 | NaOH | 100% | — | Na monochloroacetate | 50% | IPA50% | 0.31 |
| Example 2 | NaOH | 100% | — | Na monochloroacetate | 10% | IPA90% | 0.47 |
| Example 3 | NaOH | 90% | IPA10% | Na monochloroacetate | 50% | IPA50% | 0.28 |
| Example 4 | NaOH | 70% | IPA30% | Na monochloroacetate | 50% | IPA50% | 0.28 |
| Example 5 | LiOH | 100% | — | Na monochloroacetate | 50% | IPA50% | 0.25 |
| Example 6 | KOH | 100% | — | Na monochloroacetate | 50% | IPA50% | 0.25 |
| Example 7 | NaOH | 100% | — | Na monochloroacetate | 50% | Methanol 50% | 0.29 |
| Example 8 | NaOH | 100% | — | Na monochloroacetate | 50% | Ethanol 50% | 0.30 |
| Example 9 | NaOH | 100% | — | Na monochloroacetate | 50% | Acetone 50% | 0.26 |
| Example 10 | NaOH | 100% | — | Monochloroacetic acid | 50% | IPA50% | 0.31 |
| Example 11 | NaOH | 100% | — | Na monochloroacetate | 70% | IPA30% | 0.24 |
| Example 12 | NaOH | 100% | — | Na monochloroacetate | 80% | IPA20% | 0.20 |
| Comparative Example 1 | NaOH | 100% | — | Na monochloroacetate | 100% | — | 0.11 |
| Comparative Example 2 | NaOH | 10% | IPA90% | Na monochloroacetate | 10% | IPA90% | 0.27 |
| Comparative Example 3 | NaOH | 100% | — | Na monochloroacetate | 100% | — | 0.28 |

| | Carboxymethylated cellulose | | Cellulose nanofiber dispersion | | |
|---|---|---|---|---|---|
| | Degree of crystallization of cellulose I type | Rate of effective utilization of carboxymethylation agent | Viscosity (60 pm, mPa · s) | Viscosity (6 rpm, mPa · s) | Transparency |
| Example 1 | 67% | 37% | 3700 | 22000 | 94% |
| Example 2 | 63% | 56% | 2800 | 20500 | 92% |
| Example 3 | 69% | 34% | N.D. | N.D. | 93% |
| Example 4 | 64% | 34% | N.D. | N.D. | 86% |
| Example 5 | 62% | 30% | N.D. | N.D. | 82% |
| Example 6 | 61% | 30% | N.D. | N.D. | 80% |
| Example 7 | 66% | 35% | N.D. | N.D. | 92% |
| Example 8 | 67% | 36% | N.D. | N.D. | 91% |
| Example 9 | 63% | 31% | N.D. | N.D. | 90% |
| Example 10 | 60% | 36% | N.D. | N.D. | 90% |
| Example 11 | 73% | 29% | 5350 | 33000 | 84% |
| Example 12 | 74% | 24% | N.D. | N.D. | 60% |
| Comparative Example 1 | 72% | 13% | 2350 | 14000 | 7% |
| Comparative Example 2 | 64% | 32% | N.D. | N.D. | 10% |
| Comparative Example 3 | 45% | 13% | N.D. | N.D. | 90% |

It was found from the results in Table 1 that in Examples 1 to 12, in which mercerization and carboxymethylation were performed in the solvent containing mainly water and the mixed solvent of water and an organic solvent respectively, a cellulose nanofiber dispersion having a very high transparency was produced, as compared with Comparative Example 2 (solvent mediated method), in which both mercerization and carboxymethylation were performed in the solvent containing mainly an organic solvent, as a conventional method. It was also found that in Examples 1 to 12, a cellulose nanofiber dispersion having a high transparency was produced with a high rate of effective utilization of the carboxymethylation agent, as compared with Comparative Examples 1 and 3, in which both mercerization and carboxymethylation were performed with water as a solvent.

The invention claimed is:

1. A method for producing a carboxymethylated cellulose nanofiber, the method comprising:
    treating cellulose with a mercerizing agent to prepare mercerized cellulose;
    reacting the mercerized cellulose with a carboxymethylation agent to prepare carboxymethylated cellulose, wherein the carboxymethylated cellulose is one that maintains at least a portion of a fibrous shape when dispersed in water; and
    defibrating the carboxymethylated cellulose to produce a carboxymethylated cellulose nanofiber; wherein
    preparing mercerized cellulose is performed in a solvent containing 70% by mass or more of water, and preparing carboxymethylated cellulose is performed in a mixed solvent of water and an organic solvent;
    wherein the mixed solvent in preparing the carboxymethylated cellulose is a solvent comprising 50 to 99% by mass of an organic solvent.

2. The method according to claim 1, wherein the solvent containing 70% by mass or more of water in preparing mercerized cellulose is water.

3. The method according to claim 2, wherein a rate of effective utilization of the carboxymethylation agent is 15% or more.

4. The method according to claim 3, wherein the mercerizing agent comprises sodium hydroxide, lithium hydroxide, potassium hydroxide, or a combination of two or more thereof.

5. The method according to claim 4, wherein the carboxymethylation agent comprises monochloroacetic acid or sodium monochloroacetate.

6. The method according to claim 5, wherein the organic solvent comprises isopropanol, methanol, ethanol, acetone, or a combination of two or more thereof.

7. The method according to claim 6, wherein a degree of carboxymethyl substitution per anhydrous glucose unit in the carboxymethylated cellulose is less than 0.50.

8. The method according to claim 7, wherein a degree of crystallization of cellulose I type in the carboxymethylated cellulose is 50% or more.

9. The method according to claim 1, wherein a rate of effective utilization of the carboxymethylation agent is 15% or more.

10. The method according to claim 1, wherein the mercerizing agent comprises sodium hydroxide, lithium hydroxide, potassium hydroxide, or a combination of two or more thereof.

11. The method according to claim 1, wherein the carboxymethylation agent comprises monochloroacetic acid or sodium monochloroacetate.

12. The method according to claim 1, wherein the organic solvent comprises isopropanol, methanol, ethanol, acetone, or a combination of two or more thereof.

13. The method according to claim 1, wherein a degree of carboxymethyl substitution per anhydrous glucose unit in the carboxymethylated cellulose is less than 0.50.

14. The method according to claim 1, wherein a degree of crystallization of cellulose I type in the carboxymethylated cellulose is 50% or more.

15. The method according to claim 1, wherein the step of preparing mercerized cellulose is performed in a reactor, and wherein the method further comprises adding an organic solvent or an aqueous solution of an organic solvent to the reactor before, at the same time as, or immediately after the addition of the carboxymethylation agent.

\* \* \* \* \*